United States Patent
Wang

(10) Patent No.: US 10,476,981 B2
(45) Date of Patent: Nov. 12, 2019

(54) FLOW TRANSMISSION

(71) Applicant: Hewlett Packard Enterprise Development LP, Houston, TX (US)

(72) Inventor: Wei Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 134 days.

(21) Appl. No.: 15/537,210

(22) PCT Filed: Dec. 16, 2015

(86) PCT No.: PCT/CN2015/097612
§ 371 (c)(1),
(2) Date: Jun. 16, 2017

(87) PCT Pub. No.: WO2016/095822
PCT Pub. Date: Jun. 23, 2016

(65) Prior Publication Data
US 2017/0353572 A1  Dec. 7, 2017

(30) Foreign Application Priority Data
Dec. 17, 2014  (CN) .......................... 2014 1 0787852

(51) Int. Cl.
*H04L 29/08* (2006.01)
*H04L 29/06* (2006.01)
*H04L 12/801* (2013.01)

(52) U.S. Cl.
CPC .......... *H04L 67/2814* (2013.01); *H04L 29/06* (2013.01); *H04L 47/10* (2013.01); *H04L 63/10* (2013.01); *H04L 67/1097* (2013.01)

(58) Field of Classification Search
None
See application file for complete search history.

(56) References Cited

U.S. PATENT DOCUMENTS 8,885,641 B2   4/2014  Raman et al.
9,548,896 B2 *  1/2017  Naiksatam .......... H04L 41/0893
(Continued)

FOREIGN PATENT DOCUMENTS

CN   101567854 A   10/2009
CN   102055720 A    5/2011
(Continued)

OTHER PUBLICATIONS

International Search Report and Written Opinion dated Mar. 14, 2016, PCT Patent Application No. PCT/CN2015/097612 dated Dec. 16, 2015, 11 pages.

(Continued)

*Primary Examiner* — Gregory B Sefcheck
*Assistant Examiner* — Amar Persaud

(57) ABSTRACT

A SDN controller receives a packet related to flow which is uploaded from a vSwitch, and if source address and destination address of the packet related to flow belong to different physical servers, the SDN controller may distribute a source flow table entry to the vSwitch which uploads the packet related to flow. Wherein action corresponding to the source flow table entry may include: for a traffic packet whose destination address matches the destination address, by using MAC address of a vSwitch connected with the source address as outer layer source MAC address and using MAC address of a vSwitch connected with the destination address as outer layer destination MAC address, encapsulating the traffic packet into a packet having double layer VLAN tags, and forwarding the packet from a port leading to a physical network card of the physical server where the vSwitch is deployed.

20 Claims, 6 Drawing Sheets

(56) References Cited

U.S. PATENT DOCUMENTS

| | | | |
|---|---|---|---|
| 2012/0087372 A1 | 4/2012 | Narasimhan | |
| 2014/0016647 A1* | 1/2014 | Yoshida | H04L 12/4666 370/395.53 |
| 2014/0019639 A1* | 1/2014 | Ueno | H04L 61/103 709/238 |
| 2014/0241353 A1* | 8/2014 | Zhang | H04L 45/74 370/390 |
| 2015/0188773 A1* | 7/2015 | DeCusatis | G06F 9/45558 370/254 |
| 2015/0372840 A1* | 12/2015 | Benny | H04L 12/4675 370/409 |
| 2016/0127272 A1* | 5/2016 | Wang | H04L 45/66 370/392 |
| 2016/0197824 A1* | 7/2016 | Lin | H04L 12/6418 370/389 |
| 2016/0294769 A1* | 10/2016 | Song | H04L 12/4641 |

FOREIGN PATENT DOCUMENTS

| | | |
|---|---|---|
| CN | 102171998 A | 8/2011 |
| CN | 103152361 A | 6/2013 |
| CN | 103763146 | 4/2014 |
| CN | 104022960 | 9/2014 |
| EP | 2753032 A1 | 7/2014 |

OTHER PUBLICATIONS

International Preliminary Report on Patentability received for PCT Patent Application No. PCT/CN2015/097612, dated Jun. 29, 2017, 5 pages.

* cited by examiner

FLOW TRANSMISSION

BACKGROUND

Nowadays, cloud computing has become a common provision for information network construction in enterprises, and virtualization technology may be commonly employed and deployed in cloud computing. Currently, Software Defined Network (SDN) may be a prevailing solution for virtualization. And, by deploying a control plane of a network, such as various policies for all kinds of forwarding behaviors in a centralized controller. SDN may separate the control plane from a forwarding plane of the network, and thus a forwarding device may forward a flow according to a flow table distributed from the controller.

DETAILED DESCRIPTION OF THE EMBODIMENTS

In a virtualized environment, a great number of customers may share service and resource in a cloud. For example, in a public cloud, an application system provided by a cloud service provider may allow a great number of customers to share cloud resource in a same environment. In such an environment, if virtualization resources for different customers may be separated and isolated from each other, the privacy and security of customers' data may be better protected. Further, if customers' data in a virtualized network may be separated and isolated in a simple and efficient way, a cloud service may be provided to customers more conveniently and quickly.

One solution for SDN is based on an Overlay network. An Overlay network is configured to create virtual network containers which are logically separate from each other and share a same Underlay network. An Overlay network may achieve the virtualization of network by encapsulating a data packet (or data frame) in another data packet (or data frame).

Virtual Extensible Local Area Network (VXLAN) and Network Virtualization using Generic Routing Encapsulation (NVGRE) are two examples of Overlay protocols.

A tunnel forwarding mode may be employed in a VXLAN so as to encapsulate an Ethernet packet into an UDP packet. In this way, an identity field of 24 bit included in VXLAN packet header may be used to segment layer-2 network, and thus it may allow almost 16 million customers to share one same network infrastructure and be isolated from each other. A tunnel forwarding mode may be employed in a NVGRE so as to encapsulate an Ethernet packet into a GRE. In this way, a network of customer may be identified with an identifier of 24-bit, and thus the same effect, such as 16 million customers being isolated from each other, may be achieved. When encapsulating a packet, VXLAN and NVGRE both take an Ethernet packet as data part on transport layer and then add a new layer-2 header and layer-3 header.

In general, the number of customers in a data centre may be far less than 16 million, and for most application scenarios, a Virtual Local Area Network (VLAN) IDentity (ID) of 12 bit may be usually enough to identify customer networks, such as 4049 isolated customer networks at most. In an example of the present disclosure, in an Underlay network, VLAN may be usually employed to achieve a layer-2 isolation. By Overlay encapsulating a packet having a customer VLAN tag (indicating a VLAN for achieving customer isolation in a data centre) with a service VLAN tag (indicating a VLAN in an Underlay network), network isolation may be provided for 4094×4094 customers, and thus virtualization of network may be achieved.

Figure 1:
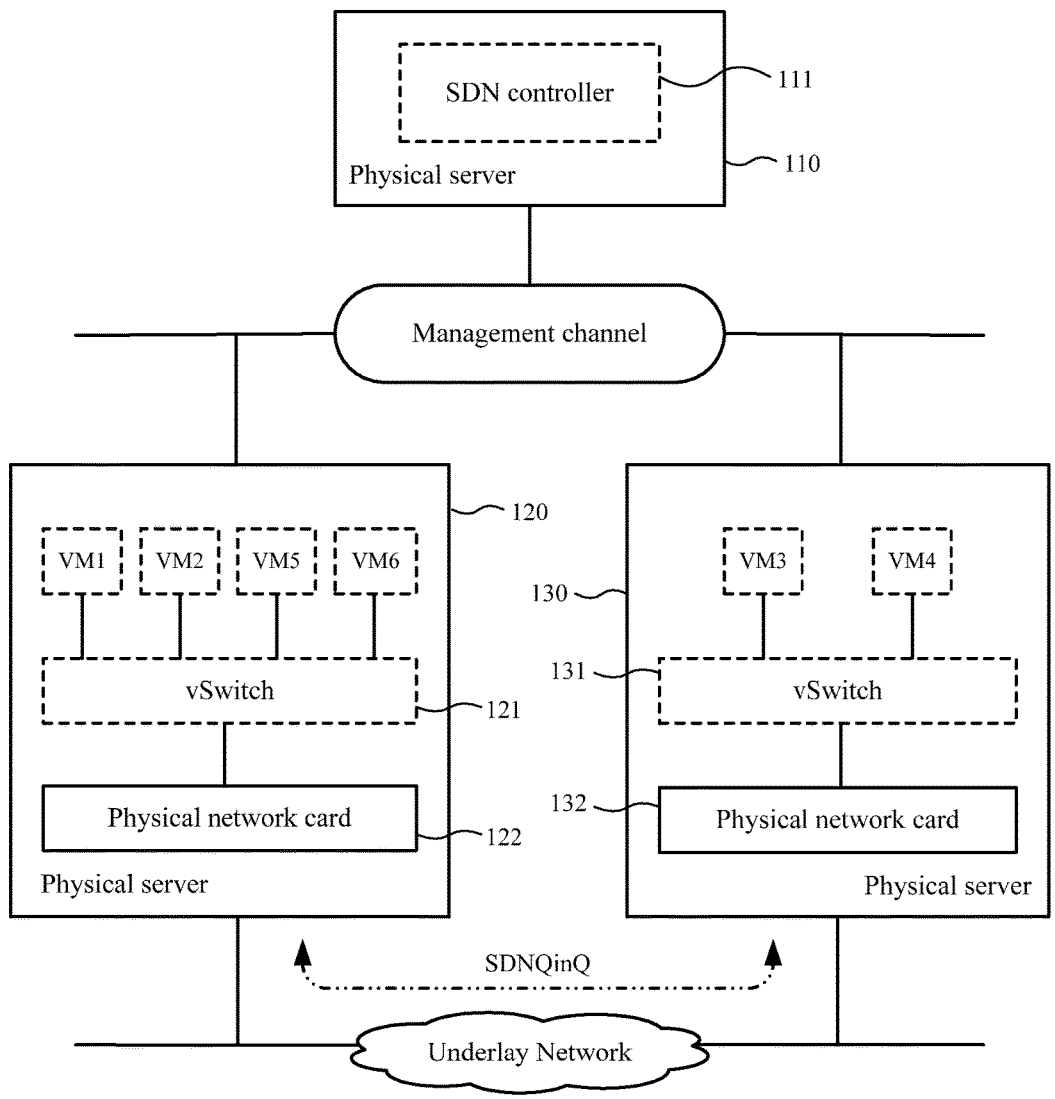
FIG. 1 illustrates a network structure of a SDN based on Overlay according to an example of the present disclosure.

FIG. 1 illustrates a networking structure of SDN based on Overlay according to an example of the present disclosure.

In FIG. 1, virtual machines VM1, VM2, VM5 and VM6, and a virtual switch (hereinafter, it may also be referred to as "vSwitch") 121 are operating on a physical server 120, and a physical network card 122 on the physical server 120 is connected to an Underlay network; virtual machines VM3 and VM4, and vSwitch 131 are operating on a physical server 130, and a physical network card 132 on the physical server 130 is connected to an Underlay network; a SDN controller 111 operating on a physical server 110 is connected with physical servers 120 and 130 through a management channel so as to manage and control each of the virtual machines and each of the vSwitches. The virtual machines operating on one same physical server may receive and transmit a packet by a vSwitch on the physical server, and the virtual machines operating on different physical servers may communicate with each other through an Underlay network.

Figure 3:
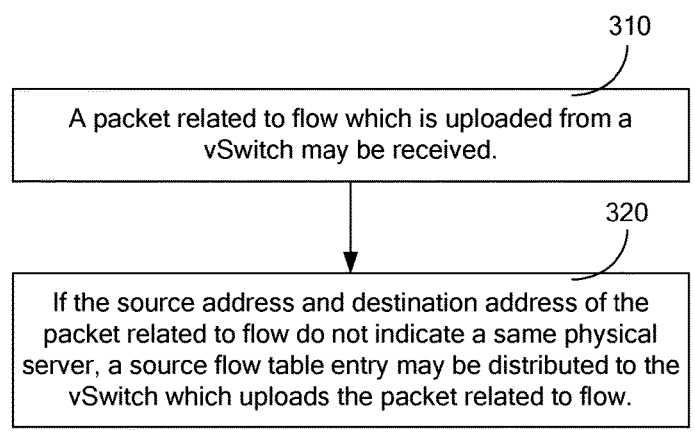
FIG. 3 is a flowchart illustrating a method for controlling flow transmission in a virtualized network on the SDN controller according to an example of the present disclosure.

In an example of the present disclosure, a device for controlling flow transmission may be operating on a SDN controller and reduce a length of packet transmitted in an Underlay network, and thus the efficiency of communication may be improved. An operating process of the device may be illustrated as in FIG. 3.

At block 310, a packet related to flow which is uploaded by a vSwitch may be received.

Here, the packet related to flow may represent a packet which may include information on how a vSwitch forwards a flow. In examples of the present disclosure, the packet related to flow may be a flow itself, such as a traffic packet based on any one of various protocols and for transmitting data or control command, and may also be a packet indicating the source and destination of a flow coming soon, such as an Address Resolution Protocol (ARP) request packet.

When a vSwitch receives a packet from a virtual machine, the vSwitch may query a local flow table, and upload a packet to a SDN controller if the packet does not match any entry in the flow table or the entry matching the packet indicates that the packet shall be sent to the SDN controller.

At block 320, if the source address and destination address of the packet related to flow do not indicate a same physical server, a source flow table entry may be distributed to the vSwitch which uploads the packet related to flow. The source flow table entry may correspond to following actions: for a traffic packet whose destination address matches the destination address of the packet related to flow, by using a Medium Access Control (MAC) address of a vSwitch connected with a source host of the source address as an outer layer source MAC address and using a MAC address of a vSwitch connected with a destination host of the destination address as an outer layer destination MAC address, encapsulating the traffic packet into a packet having double layer VLAN tags, and forwarding the encapsulated packet from a port leading to a physical network card of a physical server where the vSwitch is deployed. A double layer VLAN tag means that there are at least two VLAN tags. In this example there is an outer layer VLAN tag and an inner layer VLAN tag. The outer layer VLAN may be a service VLAN where the physical network card is located, and the inner layer VLAN may be a customer VLAN where the source address is located.

The SDN controller may store information about virtual machines, vSwitches and other managed devices which are on-line in the management domain of the SDN controller. For example, the information may include IP address and MAC address of a virtual machine, gateway of the virtual machine, a vSwitch connected with the virtual machine, a physical server where the virtual machine is deployed and a physical network card of the physical server. According to source address and destination address of the packet related to flow, a SDN controller may determine whether the source host (such as a virtual machine) of the packet related to flow and the destination host are on a same physical server. And thus, the SDN controller may determine, when a source host and a destination host process a traffic packet which has the same destination address with the packet related to flow, whether the packet will be transmitted in a same physical server or between two different physical servers.

According to any one of source IP address and source MAC address of a packet related to flow and any one of destination IP address and destination MAC address of the packet related to flow, a SDN controller may determine whether the source host and the destination host of the packet related to flow are on a same physical server. For example, if the packet related to flow is an ARP request packet, the SDN controller may determine whether the source host and the destination host are on a same physical server based on source IP address or source MAC address of the ARP request packet and destination IP address of the ARP request packet.

If the source host and the destination host of a traffic packet are not in a same physical server, the traffic packet may have to go through an Underlay network when being transmitted, and thus the traffic packet may have to be encapsulated before entering the Underlay network.

The SDN controller may distribute a source flow table entry to a vSwitch which uploads a packet related to flow, so as to instruct the vSwitch to encapsulate a traffic packet whose destination address matches that of the packet related to flow into a packet having double layer VLAN tags and forward the encapsulated packet from a port of the vSwitch connected with a physical network card. Wherein, of the double layer VLAN tags, an outer layer VLAN tag may be a tag of a service VLAN where the physical network card is located, and an inner layer VLAN tag may be a tag of a customer VLAN where the source host (source address) is located.

When a traffic packet is encapsulated, the packet having double layer VLAN tags may employ MAC address of a vSwitch connected with the source host (source address) as an outer layer source MAC address and employ MAC address of a vSwitch connected with the destination host (destination address) as an outer layer destination MAC address.

After receiving a source flow table entry distributed from a SDN controller, a vSwitch may perform corresponding actions according to the source flow table entry, such as encapsulating a traffic packet which matches the source flow table entry (such as, a traffic packet whose destination address matches that of the packet related to flow) with double layer VLAN tags, and then forwarding the encapsulated packet from a physical network card to an Underlay network.

For a packet having double layer VLAN tags, according to outer layer VLAN tag, outer layer source MAC address and outer layer destination MAC address therein, an Underlay network may forward the packet from a vSwitch of a source physical server (where a host having the source address is deployed) to a vSwitch of a destination physical server (where a host having the destination address is deployed).

Wherein, in an Underlay network, a forwarding channel may be established based on MAC address, or be dynamically established through a network administration system controlled by the SDN controller. For example, protocols such as GARP VLAN Registration Protocol (GVRP) may be used to enable layer-2 inter-connection in an Underlay network.

In an example of the present disclosure, a source physical server may access the Underlay network through a source forwarding device, and a destination physical server may access the Underlay network through a destination forwarding device, wherein, the source forwarding device and the destination forwarding device are both edge forwarding devices in the Underlay network. When a SDN controller generates a source flow table entry to be distributed to a vSwitch which uploads a packet related to flow, the SDN controller may send a VLAN channel establishing request to a network administration server, wherein, the VLAN channel establishing request may contain information about source physical server and destination physical server related to the source flow table entry.

When receiving a VLAN channel establishing request, a network administration server may query topology of the Underlay network to determine a source forwarding device and a destination forwarding device related to the source flow table entry. The network administration server may instruct the source forwarding device to generate an attribute registration datagram of the service VLAN by using bridge MAC address of the source forwarding device as source address and using bridge MAC address of the destination forwarding device as destination address, and then transmit the attribute registration packet. When transmitting the attribute registration packet, a forwarding device through which the attribute registration packet goes may add ingress port and egress port of the attribute registration packet into the service VLAN. In this way, as the attribute registration packet of the service VLAN going through the Underlay network and reaching the destination forwarding device, a forwarding channel for the service VLAN may be generated in the Underlay network.

In the present example, when the above source flow table entry generated by the SDN controller is aged and becomes invalid, the SDN controller may send a VLAN channel revocation request to the network administration server, wherein, the VLAN channel revocation request may contain information about the source physical server and the destination physical server related to the source flow table entry.

When receiving a VLAN channel revocation request, a network administration server may instruct the source forwarding device to generate an attribute cancellation packet for the service VLAN by using bridge MAC address of the source forwarding device as source address and using bridge MAC address of the destination forwarding device as destination address, and then transmit the attribute cancellation packet. As the attribute cancellation packet for the service VLAN going through the Underlay network and reaching the destination forwarding device, the forwarding channel for the service VLAN may be shut down. In this way, a forwarding channel for the service VLAN in the Underlay network may be dynamically established and shut down according to a flow table on the SDN controller, which may reduce broadcast traffic from the service VLAN in the Underlay network and improve performance of the Underlay network.

In the present example, when receiving a packet having double layer VLAN tags, a vSwitch of the destination physical server may query local flow table, and if no matching entry is found, the vSwitch may upload the packet having double layer VLAN tags onto the SDN controller.

When receiving a packet having double layer VLAN tags uploaded from a vSwitch, the SDN controller may resolve it to acquire inner VLAN tag and destination address (destination IP address and/or destination MAC address) of a traffic packet encapsulated in it, and find a destination host and a port of the destination host connected with the vSwitch in a stored database of managed devices. When the destination host and the port of the destination host connected with the vSwitch are found, the SDN controller may distribute a destination flow table entry to the vSwitch which uploads the packet having double layer VLAN tags, and actions corresponding to the destination flow table entry may include: de-capsulating the packet having double layer VLAN tags into a traffic packet, and forwarding the traffic packet from a designated port according to inner layer VLAN tag and destination address of the traffic packet.

After receiving a destination flow table entry distributed from a SDN controller, a vSwitch connected with the destination host may perform actions corresponding to the destination flow table entry. For example, for a packet having double layer VLAN tags, if inner layer customer VLAN tag and destination address both match the destination flow table entry, the vSwitch connected with the destination host may de-capsulate the packet having double layer VLAN tags to acquire a traffic packet, and forward the traffic packet through a designated port. Further, when subsequently receiving a packet having double layer VLAN tags which has the same inner layer VLAN tag and the same destination address for traffic packet, the vSwitch connected with the destination host may perform corresponding operations of de-capsulating and forwarding.

In the present example, an ARP request packet may be used as a packet related to flow, and the SDN controller may, when receiving a uploaded ARP request packet, query MAC address corresponding to destination IP address of the ARP request packet, and add the corresponding MAC address as a result of address resolution into an ARP response packet to be forwarded to source address of the ARP request packet. If source address and destination IP address of the ARP request packet are on a same physical server, the SDN controller may distribute a layer-2 flow table entry to a vSwitch which uploads the ARP request packet. Wherein, actions corresponding to the distributed layer-2 flow table entry may include: for a traffic packet whose destination address matches destination IP address of the ARP request packet, forwarding the traffic packet through a port leading to the destination address.

Wherein, if destination address of a traffic packet matches destination IP address of an ARP request packet, it may indicate that destination IP address of the traffic packet is the same with destination IP address of the ARP request packet, and/or destination MAC address of the traffic packet is a MAC address corresponding to destination IP address of the ARP request packet.

In the present example, after sending an ARP request to a destination address, a virtual machine may usually send a traffic packet to the same destination address, and thus, when an ARP request packet is used as the packet related to flow, the SDN controller may distribute a flow table entry to the vSwitch according to the ARP request packet. In this way, when the vSwitch receives a traffic packet having the same destination address from a virtual machine, the vSwitch may forward the traffic packet according to the distributed flow table entry.

In the present example, a traffic packet may also be used as the packet related to flow. When the traffic packet is used as the packet related to flow, if source address and destination address of the traffic packet are on a same physical server, the SDN controller may distribute a layer-2 flow table entry to the vSwitch which uploads the traffic packet. Wherein, action corresponding to the distributed layer-2 flow table entry may include forwarding the traffic packet through a port leading to the destination address. When the traffic packet is used as the packet related to flow, the ARP address resolution may be performed by the SDN controller. The ARP request packet sent from the virtual machine is uploaded onto the SDN controller by the vSwitch, and when receiving the ARP request packet, the SDN controller may find MAC address corresponding to destination IP address of the ARP request packet, generate an ARP response packet based on the found MAC address as a result of address resolution, and return the ARP response packet to the virtual machine which sends the ARP request packet.

In the present example, by going through the Underlay network with a service VLAN, a virtualization of layer-2 network may be realized. Further, when a traffic packet is encapsulated into a packet having double layer VLAN tags, the traffic packet is used as data part and only added with a layer-2 header, and thus the length of the encapsulated packet is relatively small, which may reduce network load and improve communication efficiency.

In other examples of the present disclosure, a new customer Customer1 may need to operate three virtual machines on two physical servers. Please refer to FIG. 1, according to the customers' demands, Customer1 is distributed with virtual machines VM1 and VM2 on physical server 120 connected with vSwitch 121 and virtual machine VM4 on physical server 130 connected with vSwitch 131, and also distributed with a customer VLAN tag 100. The virtual machines VM1, VM2 and VM4 of Customer1 are in a same network segment, shares a same gateway Gate1-IP and packets communicated between the virtual machines VM1, VM2 and VM4 may be layer-2 communication.

The tag of a service VLAN for connecting a port of physical network card 122 on physical server 120 with the Underlay network is 8, and the tag of a service VLAN for connecting a port of physical network card 132 on physical server 130 with the Underlay network is also 8. When Customer1 is on-line, the SDN controller may be stored with information about managed devices as illustrated in a table 1.

TABLE 1

| Virtual Machine | Physical Server where it is deployed | Service VLAN tag | Customer VLAN tag | MAC address | IP address |
|---|---|---|---|---|---|
| VM1 | Physical Server 120 | 8 | 100 | VM1-MAC | VM1-IP |
| VM2 | Physical Server 120 | 8 | 100 | VM2-MAC | VM2-IP |
| VM4 | Physical Server 130 | 8 | 100 | VM4-MAC | VM4-IP |

In an example of the present disclosure, an ARP request packet is used as the packet related to flow.

Scenario 1: layer-2 communication between virtual machines on a same physical server, for example, virtual machine VM1 sending a packet to virtual machine VM2.

When virtual machine VM1 of Customer1 wants to send a packet to virtual machine VM2, virtual machine VM1 may determine that virtual machines VM2 and VM1 are in a same network segment by comparing IP addresses and subnet masks. As the ARP buffer is empty, virtual machine VM1 may send an ARP request packet having a destination IP address of VM2-IP. Then, vSwitch 121 may upload the ARP request packet of virtual machine VM1 onto the SDN controller 111. The SDN controller 111 may query the Table 1, generate an ARP response packet based on MAC address VM2-MAC corresponding to IP address VM2-IP as a result of address resolution, and send the ARP response packet to virtual machine VM1 through vSwitch 121.

Since the destination IP address VM2-IP and the source address VM1-IP of the ARP request packet are deployed on the same physical server 120, the SDN controller 111 may send a layer-2 flow table entry to vSwitch 121, and the layer-2 flow table entry may correspond to following action: for a traffic packet having a destination MAC address of VM2-MAC (and/or a destination IP address of VM2-IP), forwarding the traffic packet from a port of vSwitch 121 connected with virtual machine VM2.

When receiving the ARP response packet, virtual machine VM1 may store the correspondence between IP address VM2-IP and MAC address VM2-MAC into the ARP buffer, and generate an IP packet using VM2-IP and VM2-MAC as destination address. The IP packet may be in a format as illustrated in Table 2.

TABLE 2

| Destination MAC address | Source MAC address | Etype | Source IP address | Destination IP address | Data |
|---|---|---|---|---|---|
| VM2-MAC | VM1-MAC | IP | VM1-IP | VM2-IP | Data |

Wherein, value of the Etype field is IP, and it may indicate the packet is an IP packet.

When the IP packet sent from virtual machine VM1 reaches vSwitch 121, vSwitch 121 may find a matching flow table, such as a layer-2 flow table entry distributed from the SDN controller 111, and perform corresponding action to forward the IP packet to virtual machine VM2.

Figure 4:
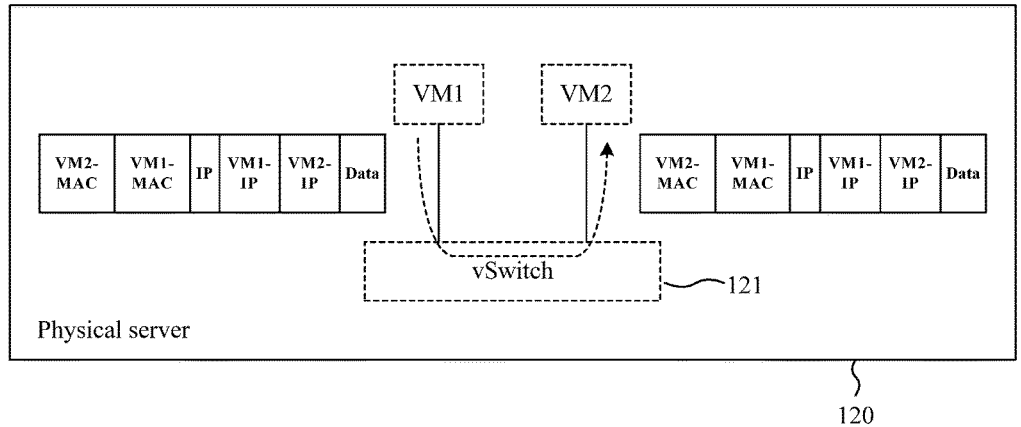
FIG. 4 is a flowchart illustrating how a packet transmitted by virtual machine VM1 gets to virtual machine VM2 in the network shown in FIG. 1 according to an example of the present disclosure.

FIG. 4 illustrates a process about how an IP packet sent from virtual machine VM1 arrives at virtual machine VM2.

Scenario 2: layer-2 communication between virtual machines on different physical servers, for example, virtual machine VM1 sending a packet to virtual machine VM4.

When virtual machine VM1 of Customer1 wants to send a packet to virtual machine VM4, virtual machine VM1 may determine that virtual machines VM4 and VM1 belong to a same network segment by comparing IP addresses and subnet masks. Since the ARP buffer does not contain MAC address of virtual machine VM4, virtual machine VM1 may send an ARP request packet having a destination IP address of VM4-IP, and vSwitch 121 may upload the ARP request packet from virtual machine VM1 onto the SDN controller 111. The SDN controller 111 may query the Table 1 to acquire that IP address VM4-IP is on physical server 130 and MAC address corresponding to IP address VM4-IP is VM4-MAC. The SDN controller may generate an ARP response packet based on MAC address VM4-MAC corresponding to IP address VM4-IP as a result of address resolution, and send the ARP response packet to virtual machine VM1 through vSwitch 121.

Since destination IP address VM4-IP and source address VM1-IP of the ARP request packet are not on a same physical server, the SDN controller 111 may send a source flow table entry to vSwitch 121, and the source flow table entry may correspond to following action: for a traffic packet having a destination MAC address of VM4-MAC (and/or a destination IP address of VM4-IP), encapsulating the traffic packet into a packet having double layer VLAN tags by using inner layer customer VLAN tag of 100, outer layer service VLAN tag of 8, source MAC address of MAC-121 (i.e., MAC address of vSwitch 121) and destination MAC address of MAC-131 (i.e., MAC address of vSwitch 131), and forwarding the encapsulated packet from a port of vSwitch 121 connected with physical network card 122.

When receiving the ARP response packet, virtual machine VM1 may store the correspondence between IP address VM4-IP and MAC address VM4-MAC into the ARP buffer, and generate an IP packet (one kind of traffic packet) using VM4-IP and VM4-MAC as destination address. The IP packet may have a format as illustrated in Table 3.

TABLE 3

| Destination MAC address | Source MAC address | Etype | Source IP address | Destination IP address | Data |
|---|---|---|---|---|---|
| VM4-MAC | VM1-MAC | IP | VM1-IP | VM4-IP | Data |

TABLE 4

| Destination MAC address | Source MAC address | Service VLAN tag | Customer VLAN tag | Etype | Data |
|---|---|---|---|---|---|
| MAC-131 | MAC-121 | 8 | 100 | SDNQinQ | Data |

When an IP packet sent from virtual machine VM1 arrives at vSwitch 121, vSwitch 121 may find a matching flow table such as a source flow table entry distributed from the SDN controller 111, and perform corresponding action such as encapsulating the IP packet having a destination MAC address of VM4-MAC and forwarding the encapsulated packet from physical network card 122 to the Underlay network. The packet having double layer VLAN tags may have a format as illustrated in Table 4.

Wherein, value of the Etype field is SDNQinQ, which means that the packet is a packet having double layer VLAN tags. In the packet as illustrated in the Table 4, the format in the data field may be illustrated as in the Table 3.

According to destination MAC address and service VLAN tag of a packet having double layer VLAN tags, the Underlay network may forward the packet to vSwitch 131 on the physical server 130. When vSwitch 131 fails to find a matching flow table, vSwitch 131 may upload the packet onto the SDN controller 111.

The SDN controller 111 may distribute a destination flow table entry to vSwitch 131, and the destination flow table entry may correspond to following action: for a packet having double layer VLAN tags, a customer VLAN tag of 100, a destination IP address of VM4-IP (or a destination MAC address of VM4-MAC), and the Etype of SDNQinQ, de-capsulating the packet into a traffic packet and forwarding the traffic packet from a port connected with virtual machine VM4.

When receiving the destination flow table entry, vSwitch 131 may perform actions corresponding to the destination flow table entry, and forward the de-capsulated IP packet to virtual machine VM4. The de-capsulated IP packet may have a format as illustrated in Table 3.

Figure 5:
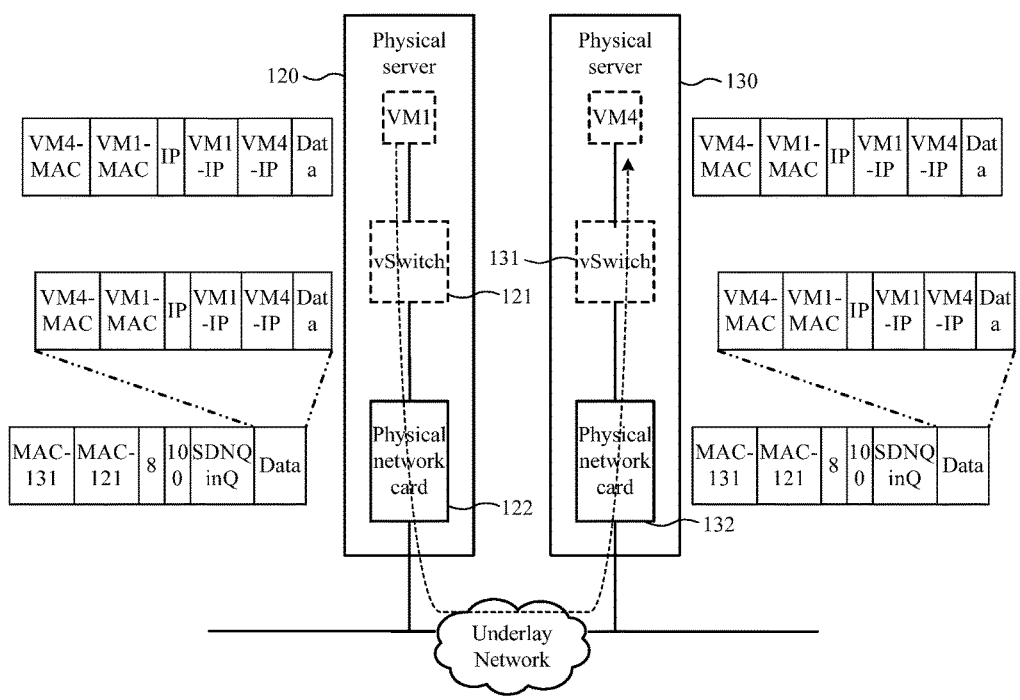
FIG. 5 is a flowchart illustrating how a packet transmitted by virtual machine VM1 gets to virtual machine VM4 in the network shown in FIG. 1 according to an example of the present disclosure.

The process about how an IP packet sent from virtual machine VM1 arrives at virtual machine VM4 may be as illustrated in FIG. 5.

In an example of the present disclosure, a traffic packet is employed as the packet related to flow. The following illustration is only about difference of the present example from the above example, and description about the same or similar parts is omitted.

Scenario 1: layer-2 communication between virtual machines on a same physical server, for example, virtual machine VM1 sending a packet to virtual machine VM2.

When virtual machine VM1 of Customer1 wants to send a packet to virtual machine VM2, virtual machine VM1 may send an ARP request packet having a destination IP address of VM2-IP for address resolution. Then, vSwitch 121 may upload the ARP request packet from virtual machine VM1 onto the SDN controller 111. The SDN controller may generate an ARP response packet based on MAC address VM2-MAC corresponding to IP address VM2-IP as a result of address resolution, and send the ARP response packet to virtual machine VM1.

When receiving an ARP response packet, virtual machine VM1 may generate an IP packet with IP address VM2-IP and MAC address VM2-MAC as destination address. The IP packet may have a format as illustrated in Table 2.

When an IP packet sent from virtual machine VM1 arrives at vSwitch 121, vSwitch 121 may find none matching flow table and upload the IP packet onto the SDN controller 111. Since destination address VM2-MAC and source address VM1-MAC of the IP packet are on a same physical server 120, the SDN controller 111 may sends a layer-2 flow table entry to vSwitch 121, and the layer-2 flow table entry may correspond to following action: for a traffic packet having a destination MAC address of VM2-MAC (and/or a destination IP address of VM2-IP), forwarding the traffic packet from a port of vSwitch 121 connected with virtual machine VM2.

When receiving the layer-2 flow table entry distributed from the SDN controller 111, vSwitch 121 may perform action corresponding to the layer-2 flow table entry, and the IP packet may be forwarded to virtual machine VM2.

The process about how an IP packet sent from virtual machine VM1 arrives at virtual machine VM2 may be as illustrated in FIG. 4.

Scenario 2: layer-2 communication between virtual machines on different physical servers, for example, virtual machine VM1 sending a packet to virtual machine VM4.

When virtual machine VM1 of Customer1 wants to send a packet to virtual machine VM4, virtual machine VM1 may send an ARP request packet having a destination IP address of VM4-IP. Then, vSwitch 121 may upload the ARP request packet of virtual machine VM1 onto the SDN controller 111. The SDN controller 111 may generate an ARP response packet based on MAC address VM4-MAC corresponding to IP address VM4-IP as a result of address resolution, and send the ARP response packet to virtual machine VM1.

When receiving the ARP response packet, virtual machine VM1 may generate an IP packet with IP address VM4-IP and MAC address VM4-MAC as destination address. The IP packet may have a format as illustrated in the Table 3.

When an IP packet sent from virtual machine VM1 arrives at vSwitch 121, vSwitch 121 may find no matching flow table and upload the IP packet onto the SDN controller 111. Since destination address VM4-MAC and source address VM1-MAC of the IP packet are not on a same physical server, the SDN controller 111 may distributes a source flow table entry to vSwitch 121, and the source flow table entry may correspond to following action: for a traffic packet having a destination MAC address of VM4-MAC (and/or a destination IP address of VM4-IP), encapsulating the traffic packet into a packet having double layer VLAN tags by using inner layer customer VLAN tag of 100, outer layer service VLAN tag of 8, source MAC address of MAC-121 (i.e., the MAC address of vSwitch 121) and destination MAC address of MAC-131 (i.e., the MAC address of vSwitch 131), and forwarding the packet from a port of vSwitch 121 connected with the physical network card 122.

After receiving the source flow table entry distributed from the SDN controller 111, vSwitch 121 may perform actions corresponding to the source flow table entry, such as encapsulating an IP packet having a destination MAC address of VM4-MAC and forwarding the encapsulated packet from the physical network card 122 into the Underlay network. The packet having double layer VLAN tags may have a format as illustrated in Table 4.

The process on the physical server 120 about a packet having double layer VLAN tags may be the same with that in above example. After being de-capsulated, the IP packet may be forwarded to virtual machine VM4. The IP packet may have a format as illustrated in Table 3.

The process about how an IP packet sent from virtual machine VM1 arrives at virtual machine VM4 may be as illustrated in FIG. 5.

Figure 6:
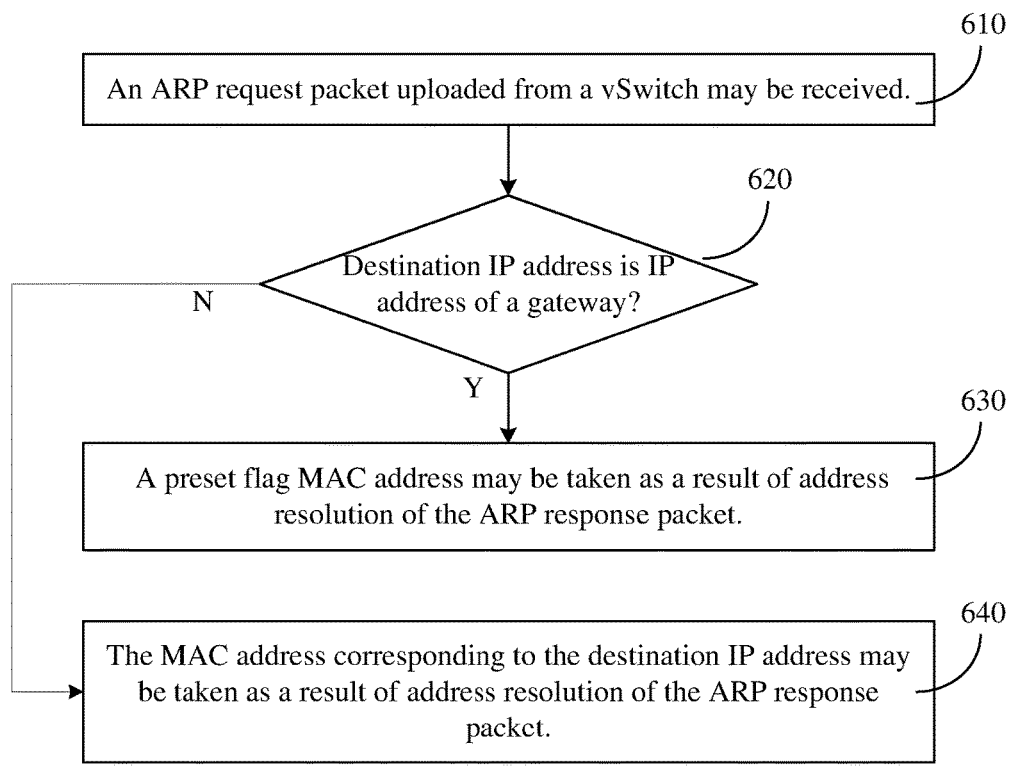
FIG. 6 is a flowchart illustrating how a SDN controller processes an ARP request message according to an example of the present disclosure.
Figure 7:
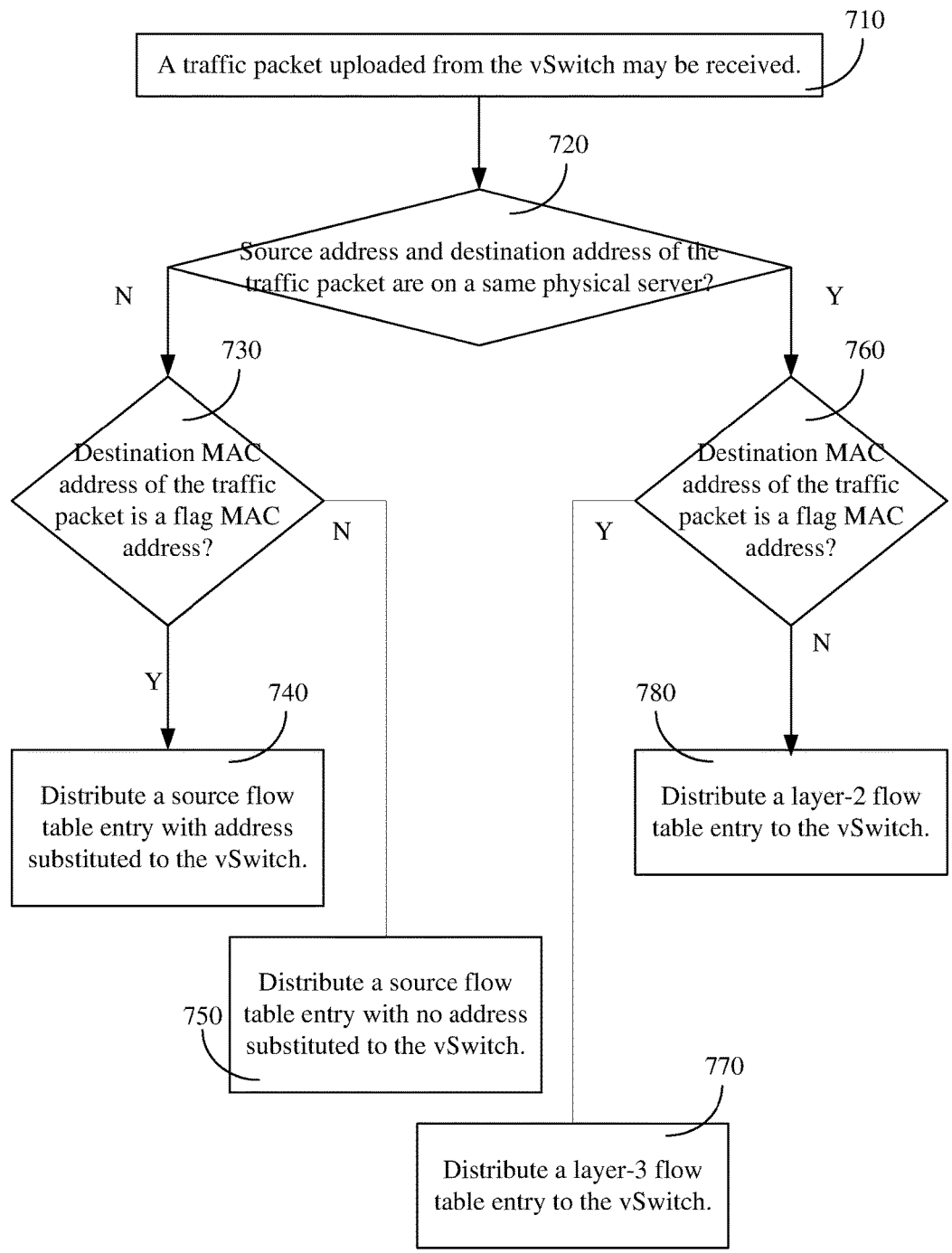
FIG. 7 is a flowchart illustrating how a SDN controller processes an Internet Protocol (IP) packet according to an example of the present disclosure.

In another example of the present disclosure, in the apparatus for controlling flow transmission on the SDN controller, the process on an ARP request packet uploaded from a vSwitch may be as illustrated in FIG. 6, and the process on an IP packet uploaded from a vSwitch may be as illustrated in FIG. 7. In the present example, by using an IP packet as the packet related to flow and resolving IP address of gateway into a flag MAC address, virtualization of layer-3 network may be realized.

At block 610, an ARP request packet uploaded from a vSwitch may be received.

When sending a packet, a virtual machine may firstly determine whether the destination host is in a same network segment with the virtual machine according to its destination IP address and its subnet mask. If the destination host is in the same network segment with the virtual machine, the virtual machine may query an ARP buffer for the MAC address corresponding to the destination IP address. If the MAC address corresponding to the destination IP address is found, the virtual machine may generate an IP packet using the corresponding MAC address. And if the MAC address corresponding to the destination IP address is not found, the virtual machine may send an ARP request packet to request the MAC address corresponding to the destination IP address.

If the destination host is not in the same network segment with the virtual machine, the virtual machine may query an ARP buffer for the MAC address of the gateway. If the MAC address of the gateway is found, the virtual machine may take the MAC address of the gateway as the destination MAC address of the IP packet. And if the MAC address of the gateway is not found, the virtual machine may send an ARP request packet to request the MAC address corresponding to the IP address of the gateway.

When the ARP request packet sent from the virtual machine arrives at the vSwitch, the vSwitch may upload the ARP request packet onto the SDN controller.

At block 620, it may determine whether destination IP address of the ARP request packet is IP address of a gateway, and if it is, the block 630 may be executed, and if not, the block 640 may be executed.

By querying stored information about managed devices, the SDN controller may determine whether the destination IP address in the ARP request packet is the IP address of the host or the IP address of the gateway.

Block 630, a preset flag MAC address may be taken as a result of address resolution of the ARP response packet, the process ends.

In response to the ARP request packet requesting the MAC address of the gateway, the SDN controller may encapsulate the flag MAC address as the MAC address corresponding to the destination IP address into an ARP response packet and reply to the virtual machine with the ARP response packet.

The preset flag MAC address may be one or more.

At block 640, the MAC address corresponding to the destination IP address may be taken as a result of address resolution of the ARP response packet.

In response to the ARP request packet requesting the MAC address of the host, the SDN controller may encapsulate the MAC address corresponding to the destination IP address into an ARP response packet and send the ARP response packet to the virtual machine.

In this way, when a virtual machine sends a packet to a destination host in different network segments, a traffic packet generated by the virtual machine may use a flag MAC as destination MAC address. In contrast, a traffic packet sent to a host in the same network segment may not contain a flag MAC address.

When an IP packet sent from the virtual machine arrives at the vSwitch, if the vSwitch cannot find a matching flow table to forward the IP packet, the vSwitch may upload the IP packet onto the SDN controller.

At block 710, a traffic packet uploaded from the vSwitch may be received.

At block 720, it may determine whether source address and destination address of the traffic packet are on a same physical server, and if yes, proceeding to block 760, otherwise, proceeding to block 730.

At block 730, it may determine whether destination MAC address of the traffic packet is a flag MAC address, and if yes, proceeding to block 740, otherwise, proceeding to block 750.

At block 740, it may distribute a source flow table entry with address substituted to the vSwitch, and the source flow table entry may correspond to following actions: for a traffic packet whose destination MAC address is the flag MAC address and destination IP address matches that of the uploaded traffic packet, substituting the destination MAC address with the MAC address corresponding to the destination IP address: encapsulating the traffic packet with address substituted into a packet having double layer VLAN tags; and forwarding the packet from a port of the physical network card of the physical server where the vSwitch is deployed. Wherein, in the double layer VLANs, the outer layer VLAN is a VLAN where the port of the physical network card is located, and the inner layer VLAN is a customer VLAN where the source address of the traffic packet is located. The process ends.

At block 750, it may distribute a source flow table entry with no address substituted to the vSwitch, the source flow table entry corresponding to the following action: for a traffic packet whose destination IP address matches the uploaded traffic packet and destination MAC address is different from the flag MAC address, encapsulating the traffic packet into a packet having double layer VLAN tags and forwarding the encapsulated packet from a port of the physical network card of the physical server where the vSwitch is deployed. Wherein, in the double layer VLANs, the outer layer VLAN is a VLAN where the port of the physical network card is located, and the inner layer VLAN is a customer VLAN where the source address of the traffic packet is located. The process ends.

In this example, for layer-2 communication or layer-3 communication between a source host and a destination host which are deployed on different physical servers, the SDN controller may instruct the vSwitch to encapsulate a traffic packet and then forward the encapsulated packet. The detailed description about encapsulating and forwarding may be referenced to previous examples and is omitted here.

At block 760, it may determine whether destination MAC address of the traffic packet is a flag MAC address or not, and if yes, proceeding to block 770, and otherwise, proceeding to block 780.

At block 770, it may distribute a layer-3 flow table entry to the vSwitch, and the layer-3 flow table entry may correspond to following action: for a traffic packet whose destination IP address matches the uploaded traffic packet and destination MAC address is a flag MAC address, substituting the flag MAC address with MAC address corresponding to destination IP address, and then forwarding the traffic packet from a port leading to the destination address (the destination IP address and/or the destination MAC address). The process ends.

For layer-3 forwarding between a source host and a destination host which are deployed on a same physical server, the SDN controller may instruct the vSwitch to substitute a flag MAC address in the IP packet with a real MAC address of the destination host, and then forward the IP packet to the destination host.

At block 780, it may distribute a layer-2 flow table entry to the vSwitch, and the layer-2 flow table entry may correspond to following action: for a traffic packet whose destination MAC address matches the uploaded traffic packet, forwarding the traffic packet from a port leading to the destination address.

It should be noted that, in blocks 770 and 780, the port on the vSwitch leading to the destination address may be a port connected with the destination host (if the destination host and the source host are connected with a same vSwitch), and may also be a port connected with another vSwitch (if the destination host and the source host are connected with different vSwitches).

In a virtualized network, in order to facilitate migration of a virtual machine, IP address and gateway configured on the virtual machine may usually remain unchanged. In this example, when performing address resolution, the SDN controller may use a preset virtual flag MAC address as MAC address of a gateway, and control the vSwitch to substitute the flag MAC address with MAC address corresponding to destination IP address according to a distributed flow table, so as to decouple IP address of the virtual machine from the physical network. When the virtual machine migrates, by updating flow table of related vSwitch, the virtual machine may return to normal communication without changing IP address of the virtual machine, which may realize virtualization of layer-3 network.

In a fifth example of the present disclosure, a new customer Customer1 may need to operate four virtual machines on two physical servers, and a new customer Customer2 may need to operate two virtual machines deployed in different network segments.

Referring to FIG. 1, according to the requirements of the customers, Customer1 is distributed with virtual machines VM1 and VM2 on the physical server 120 connected with vSwitch 121 and virtual machines VM3 and VM4 on the physical server 130 connected with vSwitch 131, and Customer1 is also distributed with a customer VLAN tag of 100; Customer2 is distributed with virtual machines VM5 and VM6 on the physical server 120 connected with vSwitch 121, and Customer2 is also distributed with a customer VLAN tag of 200. Virtual machines VM1, VM2 and VM4 of the Customer1 are in a same network segment and share a same gateway of Gate1-IP; virtual machine VM3 is in another network segment and has a gateway of Gate3-IP. Virtual machines VM5 and VM6 of the Customer2 are deployed in different network segments, and virtual machine VM5 has a gateway of Gate5-IP and virtual machine VM6 has a gateway of Gate6-IP.

The service VLAN for connecting the physical network card 122 of the physical server 120 with the Underlay network has a tag of 8, and the service VLAN for connecting the physical network card 132 of the physical server 130 with the Underlay network also has a tag of 8. When the Customer1 and the Customer2 are on-line, the SDN controller may store information about managed devices as illustrated in Table 5.

TABLE 5

| Virtual Machine | Physical Server where it is deployed | Tag of service VLAN | Tag of customer VLAN | MAC address | IP address | Gateway |
|---|---|---|---|---|---|---|
| VM1 | Physical server 120 | 8 | 100 | VM1-MAC | VM1-IP | Gate1-IP |
| VM2 | Physical server 120 | 8 | 100 | VM2-MAC | VM2-IP | Gate1-IP |
| VM3 | Physical server 130 | 8 | 100 | VM3-MAC | VM3-IP | Gate3-IP |
| VM4 | Physical server 130 | 8 | 100 | VM4-MAC | VM4-IP | Gate1-IP |
| VM5 | Physical server 120 | 8 | 200 | VM5-MAC | VM5-IP | Gate5-IP |
| VM6 | Physical server 120 | 8 | 200 | VM6-MAC | VM6-IP | Gate6-IP |

Scenario 1: layer-2 communication between virtual machines on a same physical server, for example, virtual machine VM1 sending a packet to virtual machine VM2.

When virtual machine VM1 of Customer1 wants to send a packet to virtual machine VM2, by comparing IP addresses and subnet masks, virtual machine VM1 may determine that virtual machine VM2 belongs to a same network segment with virtual machine VM1 (therefore, virtual machines VM1 and VM2 share a same gateway of Gate1-IP). Since an ARP buffer is empty, virtual machine VM1 may send an ARP request packet having a destination IP address of VM2-IP. Then, vSwitch 121 may upload the ARP request packet of virtual machine VM1 onto the SDN controller 111. By querying Table 5, the SDN controller 111 may acquire that destination IP address of the ARP request packet is not a gateway (Gate1-IP), generate an ARP response packet based on MAC address VM2-MAC as a result of address resolution, and send the ARP response packet to virtual machine VM1 through vSwitch 121.

When receiving the ARP response packet, virtual machine VM1 may store the correspondence between the IP address VM2-IP and the MAC address VM2-MAC into the ARP buffer, and generate an IP packet with the VM2-IP and VM2-MAC as destination address. The IP packet may be in a format as illustrated in Table 6.

TABLE 6

| Destination MAC address | Source MAC address | Etype | Source IP address | Destination IP address | Data |
|---|---|---|---|---|---|
| VM2-MAC | VM1-MAC | IP | VM1-IP | VM2-IP | Data |

When the IP packet sent from virtual machine VM1 arrives at vSwitch 121, vSwitch 121 may find no matching flow table, and upload the IP packet onto the SDN controller 111. By querying Table 5, the SDN controller 111 may determine that source address and destination address of the IP packet are on a same physical server and destination MAC address of the IP packet is MAC address of a host rather than a flag MAC address. Then, the SDN controller 111 may distribute a layer-2 flow table entry to vSwitch 121, and the layer-2 flow table entry may correspond to following action: for a traffic packet having VM2-MAC as destination MAC address, forwarding the traffic packet from a port of vSwitch 121 connected with virtual machine VM2.

After receiving the layer-2 flow table entry, vSwitch 121 may perform actions corresponding to the layer-2 flow table entry, such as forwarding an IP packet which matches the layer-2 flow table entry to virtual machine VM2.

The process about how an IP packet sent from virtual machine VM1 arrives at virtual machine VM2 may be as illustrated in FIG. 4.

Scenario 2: layer-3 communication between virtual machines on a same physical server, for example, virtual machine VM5 sending a packet to virtual machine VM6.

When virtual machine VM5 of Customer2 wants to send a packet to virtual machine VM6, by comparing IP addresses and subnet masks, virtual machine VM5 may determine that virtual machines VM5 and VM6 belong to different network segments (virtual machines VM5 and VM6 have different gateways). Since an ARP buffer is empty, virtual machine VM5 may send an ARP request packet having destination IP address of Gate5-IP. Then, vSwitch 121 may upload the ARP request packet from virtual machine VM5 onto the SDN controller 111. By querying the Table 5, the SDN controller may determine that destination IP address of the ARP request packet is a gateway (Gate5-IP), generate an ARP response packet with a flag MAC address Flag-MAC as a result of address resolution, and send the ARP response packet to virtual machine VM5 through vSwitch 121.

When receiving the ARP response packet, virtual machine VM5 may store the correspondence between Gate5-IP and Flag-MAC into the ARP buffer, and generate an IP packet with VM6-IP and Flag-MAC as destination address. The IP packet may have a format as illustrated in Table 7.

TABLE 7

| Destination MAC address | Source MAC address | Etype | Source IP address | Destination IP address | Data |
|---|---|---|---|---|---|
| Flag-MAC | VM5-MAC | IP | VM5-IP | VM6-IP | Data |

When an IP packet sent from virtual machine VM5 arrives at vSwitch 121, vSwitch 121 may find no matching flow table, and upload the IP packet onto the SDN controller 111. Since source IP address VM5-IP and destination IP address VM6-IP of the IP packet are on the same physical server 120, and destination MAC address of the IP packet is a flag MAC address, the SDN controller 111 may send a layer-3 flow table entry to vSwitch 121, and the layer-3 flow table entry may correspond to following actions: for a traffic packet having Flag-MAC as destination MAC address and VM6-IP as destination IP address, substituting destination MAC address of the traffic packet with VM6-MAC, and then forwarding the traffic packet from a port of vSwitch 121 connected with virtual machine VM6.

The IP packet with destination MAC address substituted may have a format as illustrated in Table 8.

TABLE 8

| Destination MAC address | Source MAC address | Etype | Source IP address | Destination IP address | Data |
|---|---|---|---|---|---|
| VM6-MAC | VM5-MAC | IP | VM5-IP | VM6-IP | Data |

After receiving the layer-3 flow table entry, vSwitch 121 may perform action corresponding to the layer-3 flow table entry, such as forwarding an IP packet with destination MAC address substituted to virtual machine VM6.

Figure 8:
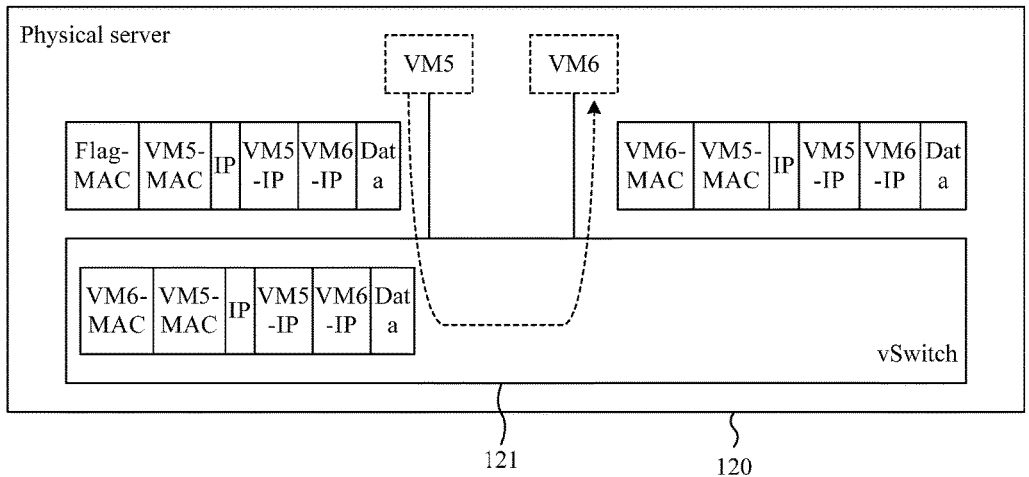
FIG. 8 is a flowchart illustrating how a packet transmitted by virtual machine VM5 gets to virtual machine VM6 in the network shown in FIG. 1 according to an example of the present disclosure.

The process about how an IP packet sent from virtual machine VM5 arrives at virtual machine VM6 may be as illustrated in FIG. 8.

Scenario 3: layer-3 communication between virtual machines on different physical servers, for example, virtual machine VM3 sending a packet to virtual machine VM1.

When virtual machine VM1 of Customer1 wants to send a packet to virtual machine VM3, by comparing IP addresses and subnet masks, virtual machine VM1 may determine that virtual machines VM3 and VM1 belong to different network segments (virtual machines VM1 and VM3 have different gateways). Since the ARP buffer does not contain MAC address of gateway for virtual machine VM1, virtual machine VM1 may send an ARP request packet having destination IP address of Gate1-IP. Then, vSwitch 121 may upload the ARP request packet of virtual machine VM1 onto the SDN controller 111. By querying the Table 5, the SDN controller 111 may determine that destination IP address of the ARP request packet is a gateway (Gate1-IP), generate an ARP response packet with flag MAC address Flag-MAC as a result of address resolution, and send the ARP response packet to virtual machine VM1 through vSwitch 121.

When receiving the ARP response packet, virtual machine VM1 may store the correspondence between Gate1-IP and Flag-MAC into the ARP buffer, and generate an IP packet with VM3-IP and Flag-MAC as destination address. The IP packet may have a format as illustrated in Table 9.

TABLE 9

| Destination MAC address | Source MAC address | Etype | Source IP address | Destination IP address | Data |
|---|---|---|---|---|---|
| Flag-MAC | VM1-MAC | IP | VM1-IP | VM3-IP | Data |

When an IP packet sent from virtual machine VM1 arrives at vSwitch 121, vSwitch 121 may find no matching flow table, and upload the IP packet onto the SDN controller 111. Since source IP address VM1-IP of the IP packet is deployed on the physical server 120 and destination IP address VM3-IP of the IP packet is deployed on the physical server 130, and destination MAC address of the IP packet is flag MAC address, the SDN controller 111 may send a source flow table entry with address substituted to vSwitch 121, and the source flow table entry with address substituted may correspond to following actions: for a traffic packet having destination MAC address of Flag-MAC and destination IP address of VM3-IP, substituting the destination MAC address of the traffic packet with VM3-MAC, encapsulating the traffic packet into a packet having double layer VLAN tags with inner layer customer VLAN tag of 100, outer layer service VLAN tag of 8, source MAC address of MAC-121 (i.e., MAC address of vSwitch 121) and destination MAC address of MAC-131 (i.e., MAC address of vSwitch 131), and forwarding the encapsulated packet from a port of vSwitch 121 connected with the physical network card 122.

After receiving the source flow table entry, vSwitch 121 may perform action corresponding to the source flow table entry, such as encapsulating an IP packet with destination MAC address substituted and forwarding the encapsulated packet from the physical network card 122 to the Underlay network.

The packet having double layer VLAN tags may have a format as illustrated in Table 10.

TABLE 10

| Destination MAC address | Source MAC address | Service VLAN tag | Customer VLAN tag | Etype | Data |
|---|---|---|---|---|---|
| MAC-131 | MAC-121 | 8 | 100 | SDNQinQ | Data |

In the packet illustrated in Table 10, the format inside the data field may be as illustrated in Table 11.

TABLE 11

| Destination MAC address | Source MAC address | Etype | Source IP address | Destination IP address | Data |
|---|---|---|---|---|---|
| VM3-MAC | VM1-MAC | IP | VM1-IP | VM3-IP | Data |

According to destination MAC address and service VLAN tag of a packet having double layer VLAN tags, the Underlay network may forward the packet to vSwitch 131 of the physical server 130. Then, vSwitch 131 may find no matching flow table, and upload the packet onto the SDN controller 111. The SDN controller 111 may distribute a destination flow table entry to vSwitch 131, and the destination flow table entry may correspond to following action: for a packet having double layer VLAN tags of which customer VLAN tag is 100, destination IP address is VM3-IP (or destination MAC address of a traffic packet therein is VM3-MAC), and value of the Etype is SDNQinQ, de-capsulating the packet into a traffic packet, and then forwarding the traffic packet from a port connected with virtual machine VM3.

After receiving the destination flow table entry, vSwitch 131 may perform actions corresponding to the destination flow table entry, such as de-capsulating an IP packet which matches the destination flow table entry and forwarding the de-capsulated IP packet to virtual machine VM3. The de-capsulated IP packet may have a format as illustrated in Table 11.

Figure 9:
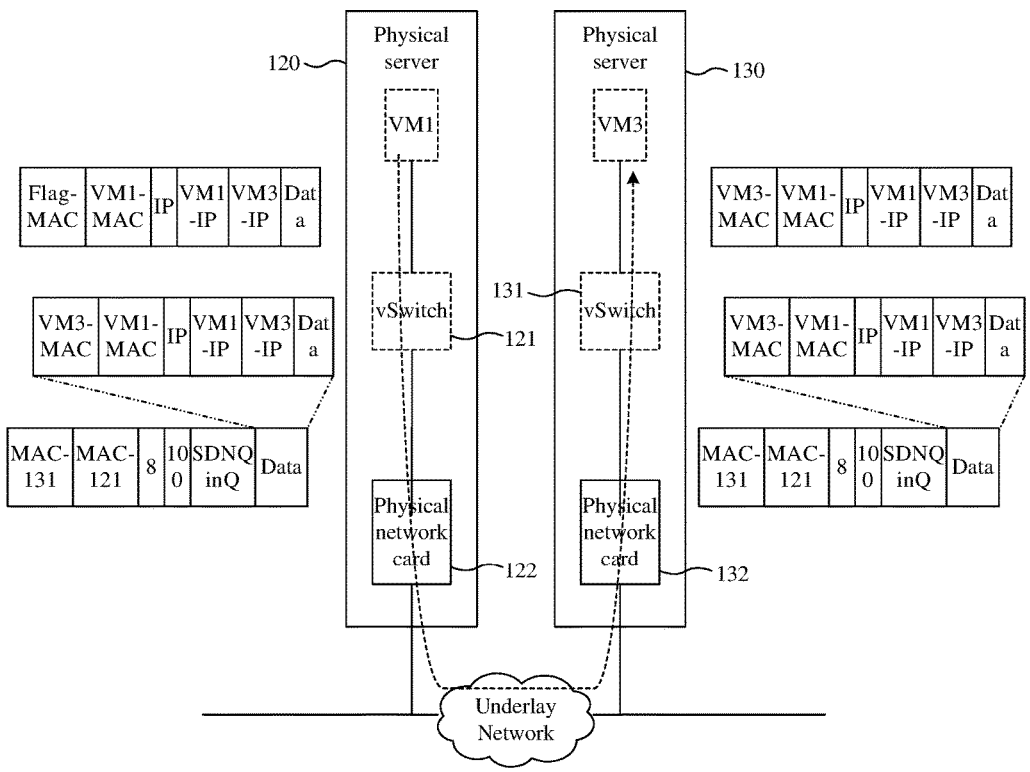
FIG. 9 is a flowchart illustrating how a packet transmitted by virtual machine VM1 gets to virtual machine VM3 in the network shown in FIG. 1 according to an example of the present disclosure.

The process about how an IP packet sent from virtual machine VM1 arrives at virtual machine VM3 may be as illustrated in FIG. 9.

Scenario 4: layer-2 communication between virtual machines on different physical servers, for example, virtual machine VM4 sending a packet to virtual machine VM1.

When virtual machine VM1 of Customer1 wants to send a packet to virtual machine VM4, by comparing IP addresses and subnet masks, virtual machine VM1 may determine that virtual machines VM4 and VM1 belong to a same network segment, and virtual machine VM1 may send an ARP request packet having destination IP address of VM4-IP. Then, vSwitch 121 may upload the ARP request packet of virtual machine VM1 onto the SDN controller 111. By querying Table 5, the SDN controller 111 may acquire that destination IP address of the ARP request packet is different from gateway (Gate1-IP), generate an ARP response packet with MAC address VM4-MAC as a result of address resolution, and send the ARP response packet to virtual machine VM1 through vSwitch 121.

When receiving the ARP response packet, virtual machine VM1 may store the correspondence between IP address VM4-IP and MAC address VM4-MAC into the ARP buffer, and generate an IP packet with VM4-IP and VM4-MAC as destination address. The IP packet may be in a format as shown in Table 12.

TABLE 12

| Destination MAC address | Source MAC address | Etype | Source IP address | Destination IP address | Data |
|---|---|---|---|---|---|
| VM4-MAC | VM1-MAC | IP | VM1-IP | VM4-IP | Data |

When the IP packet sent from virtual machine VM1 arrives at vSwitch 121, vSwitch 121 may find no matching flow table, and upload the IP packet onto the SDN controller 111. By querying Table 5, the SDN controller 111 may determine that source address and destination address of the IP packet are deployed on different physical servers, and destination MAC address of the IP packet is MAC address of a host rather than a flag MAC address. And then, the SDN controller 111 may distribute a source flow table entry with no address substituted to vSwitch 121, and the source flow table entry with no address substituted may correspond to following action: for a traffic packet having destination MAC address of VM4-MAC, encapsulating the traffic packet into a packet having double layer VLAN tags with inner layer customer VLAN tag of 100, outer layer service VLAN tag of 8, source MAC address of MAC-121 and destination MAC address of MAC-131, and forwarding the packet from a port of vSwitch 121 connected with the physical network card 122.

When receiving the source flow table entry, vSwitch 121 may perform action corresponding to the source flow table entry, such as encapsulating an IP packet matching the source flow entry and forwarding the encapsulated IP packet from the physical network card 122 to the Underlay network. The packet having double layer VLAN tags may have a format as illustrated in Table 10. In the packet illustrated in Table 10, the format inside the data field may be as illustrated in Table 12. The process about how the IP packet sent from virtual machine VM1 arrives at virtual machine VM4 may be as illustrated in FIG. 5.

Figure 2:
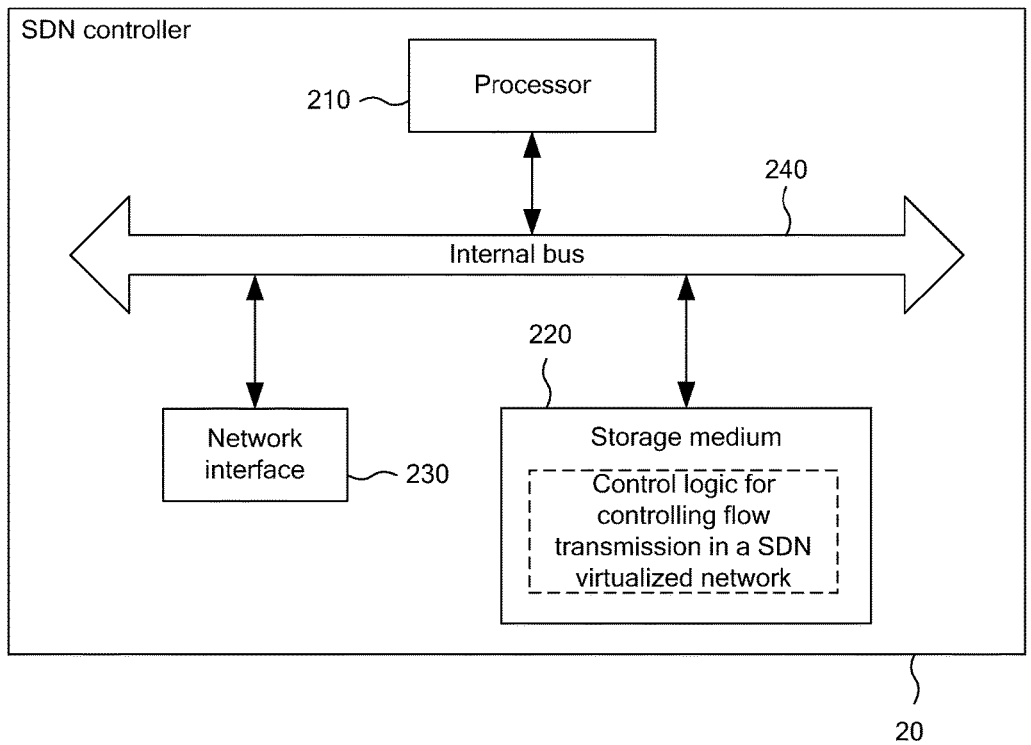
FIG. 2 illustrates a hardware architecture of a physical apparatus in which a SDN controller is provided according to an example of the present disclosure.

In correspondence with the above process, the present application provides a device for controlling flow transmission in a SDN virtualized network, which may be applied on a physical device operating the SDN controller, and the SDN controller may have a hardware structure as illustrated in FIG. 2. Referring to FIG. 2, the SDN controller 20 may include a processor (such as a CPU) 210, a machine readable storage medium 220 and a network interface 230, and these hardware components are connected with each other through an internal bus 240.

Wherein, the machine readable storage medium 220 is configured to store instructions, and when being executed by the processor 210, these instructions are mainly configured to perform flow transmission controlling function in the SDN virtualized network.

The processor 210 communicates with the machine readable storage medium 220, reads and executes the instructions stored in the machine readable storage medium 220 to perform flow transmission controlling function in the SDN virtualized network.

The machine readable storage medium 220 may be any electronic, magnetic, optic or other type of physical storage medium, which may include or store information such as executable instructions and data. For example, the machine readable storage medium 220 may be random access memory (RAM), volatile memory, non-volatile memory, flash memory, storage drive such as hard disk drive, solid state hard disk, other types of storage disk such as optic disk and DVD, or similar types of storage medium, or combinations thereof. Besides, any of the machine readable storage medium described herein may be non-transitory memory.

Wherein, the processor of the SDN controller reads and executes instructions corresponding to a control logic for controlling flow transmission in a SDN virtualized network stored in the machine readable storage medium and performs the following operations:

receiving, by a SDN controller, a packet related to flow which is uploaded from a vSwitch; and if source address and destination address of the packet related to flow belong to different physical servers, distributing a source flow table entry to the vSwitch which uploads the packet related to flow;

wherein, action corresponding to the source flow table entry includes: for a traffic packet whose destination address matches the destination address, by using MAC address of a vSwitch connected with the source address as outer layer source MAC address and using MAC address of a vSwitch connected with the destination address as outer layer destination MAC address, encapsulating the traffic packet into a packet having double layer VLAN tags, and forwarding the packet from a port leading to a physical network card of the physical server where the vSwitch is deployed;

in the double layer VLANs, the outer layer VLAN is a service VLAN where the port of the physical network card is located, and the inner layer VLAN is a customer VLAN where the source address is located.

In another example, the operations may further include:

receiving a packet having double layer VLAN tags which is uploaded from a vSwitch; and distributing a destination flow table entry to the vSwitch which uploads the packet having double layer VLAN tags;

wherein, action corresponding to the destination flow table entry includes: de-capsulating the packet having double layer VLAN tags into a traffic packet, and forwarding the traffic packet from a designated port according to inner layer VLAN tag of the packet having double layer VLAN tags and destination address of the traffic packet.

In an example, the packet related to flow may be an ARP request packet, the operations may further include:

taking a MAC address corresponding to destination IP address of the ARP request packet as a result of address resolution in response to the ARP request packet; and if source address and destination IP address of the ARP request packet belong to a same physical server, distributing a layer-2 flow table entry to a vSwitch which uploads the ARP request packet;

wherein, action corresponding to the layer-2 flow table entry includes: for a traffic packet whose destination address matches the destination IP address of the ARP request packet, forwarding the traffic packet from a port leading to the destination address.

In another example, the packet related to flow may be a traffic packet; the operations may further include:

if source address and destination address of the traffic packet belong to a same physical server, distributing a layer-2 flow table entry to a vSwitch which uploads the traffic packet;

wherein, action corresponding to the layer-2 flow table entry includes: for a traffic packet whose destination address matches the destination address of the uploaded traffic packet, forwarding the traffic packet from a port leading to the destination address.

In an example, the packet related to flow may be a traffic packet; the operations may further include:

receiving an ARP request packet uploaded from a vSwitch;

if destination IP address of the ARP request packet indicates a gateway, taking a preset flag MAC address as a result of address resolution in response to the ARP request;

if destination IP address of the ARP request packet does not indicates a gateway, taking a MAC address corresponding to destination IP address of the ARP request packet as a result of address resolution in response to the ARP request packet.

In the present example, in a case that destination MAC address of a traffic packet uploaded from a vSwitch is the flag MAC address, and source address of the packet related to flow includes source IP address of the traffic packet and destination address of the packet related to flow includes destination IP address of the traffic packet; the action corresponding to the source flow table entry further includes:

if destination IP address of the traffic packet is same as that of the packet related to flow, substituting the flag MAC address in the traffic packet with MAC address corresponding to the destination IP address.

In the present example, the operations may further include:

if source address and destination address of the traffic packet belong to a same physical server, distributing a layer-3 flow table entry to the vSwitch which uploads the traffic packet:

wherein, action corresponding to the layer-3 flow table entry includes: for a traffic packet whose destination IP address is the destination IP address and destination MAC address is the flag MAC address, substituting the flag MAC address with MAC address corresponding to the destination IP address and then forwarding the traffic packet from a port leading to the destination address.

In the present example, in a case that destination MAC address of a traffic packet uploaded from a vSwitch is different from the flag MAC address: the operations may further include:

if source address and destination address of the traffic packet belong to a same physical server, distributing a layer-2 flow table entry to the vSwitch which uploads the traffic packet;

wherein, action corresponding to the layer-2 flow table entry includes: for a traffic packet whose destination MAC address is the destination MAC address, forwarding the traffic packet from a port leading to the destination address.

if source address and destination address of the traffic packet belong to a same physical server, distributing a layer-2 flow table entry to the vSwitch which uploads the traffic packet;

wherein, action corresponding to the layer-2 flow table entry includes: for a traffic packet whose destination MAC address is the destination MAC address, forwarding the traffic packet from a port leading to the destination address.

The foregoing disclosure is merely illustrative of preferred embodiments of the disclosure but are not intended to limit the disclosure, and any modifications, equivalent substitutions, adaptations, thereof made without departing from the spirit and scope of the disclosure shall be encompassed in the claimed scope of the appended claims.

The invention claimed is:

1. A method for comprising:
 sending, by a first virtual switch (vSwitch) to a SDN controller, a packet related to flow, the first vSwitch being part of a first physical server;

receiving, by the first vSwitch from the SDN controller, a source flow table entry responsive to the SDN controller determining that a source address and a destination address of the packet related to flow belong to different physical servers comprising the first physical server and a second physical server;

for a traffic packet whose destination address matches the destination address of the packet related to flow, encapsulating, by the first vSwitch, the traffic packet into an encapsulated packet having double layer virtual local area network (VLAN) tags, the encapsulating comprising including, in the encapsulated packet, an outer layer VLAN tag of a service VLAN where a physical network card of the first physical server is located, an inner layer VLAN tag of a customer VLAN where the source address is located, an outer layer source medium access control (MAC) address of the first vSwitch that is connected to a source host having the source address, and an outer layer destination MAC address of a second vSwitch connected to a destination host having the destination address;

forwarding the encapsulated packet from a port of the first vSwitch leading to the physical network card of the first physical server to cause the encapsulated packet to be sent to the second vSwitch and receiving, by the SDN controller from the first vSwitch, a further traffic packet;

responsive to determining that a destination MAC address of the further traffic packet is a flag MAC address of a gateway, sending, by the SDN controller to the first vSwitch, a further source flow table entry with a MAC address substituted with the flag MAC address; and;

if the destination MAC address of the further traffic packet is the flag MAC address of the further flow table entry, substituting the flag MAC address in the further traffic packet with a MAC address corresponding to a destination IP address of the destination host.

2. The method of claim 1, further comprising:
sending, by the second vSwitch to the SDN controller, the encapsulated packet having the double layer VLAN tags;
receiving, by the second vSwitch from the SDN controller, a destination flow table entry in response to the sending of the encapsulated packet to the SDN controller;
de-capsulating, by the second vSwitch, the encapsulated packet having the double layer VLAN tags into a de-capsulated traffic packet; and
forwarding the de-capsulated traffic packet from a designated port according to the inner layer VLAN tag-and the destination address of the traffic packet.

3. The method of claim 1, wherein the packet related to flow is an address resolution protocol (ARP) request packet comprising a source Internet Protocol (IP) address and a destination IP address, the method further comprising:
determining, by the SDN controller, a MAC address corresponding to the destination IP address of the ARP request packet as a result of address resolution in response to the ARP request packet; and
if the source IP address and the destination IP address of the ARP request packet belong to a same physical server, distributing, by the SDN controller, a layer-2 flow table entry to the first vSwitch.

4. The method of claim 1, wherein the packet related to flow is the traffic packet, the method further comprising:
if the source address and the destination address of the traffic packet belong to a same physical server, distributing, by the SDN controller, a layer-2 flow table entry to the first vSwitch.

5. The method of claim 1, further comprising:
receiving, by the SDN controller from the first vSwitch, an ARP request packet comprising a source Internet Protocol (IP) address and a destination IP address;
if the destination IP address of the ARP request packet indicates a gateway, determining, by the SDN controller, a flag MAC address of the gateway as a result of address resolution in response to the ARP request packet, and including, in an ARP response packet, the flag MAC address of the gateway as a MAC address corresponding to the destination IP address;
if the destination IP address of the ARP request packet does not indicate a gateway, determining, by the SDN controller, a MAC address of the destination host corresponding to the destination IP address of the ARP request packet as a result of address resolution in response to the ARP request packet, and including, in an ARP response packet, the MAC address of the destination host as the MAC address corresponding to the destination IP address.

6. The method of claim 1, further comprising:
if a source Internet Protocol (IP) address and a destination IP address of the further traffic packet belong to a same physical server, distributing, by the SDN controller, a layer-3 flow table entry to the first vSwitch; and
responsive to the layer-3 flow table entry, if a destination MAC address of the further traffic packet is a flag MAC address of a gateway, substituting the flag MAC address in the further traffic packet with a MAC address corresponding to the destination IP address, and forwarding the further traffic packet from a port leading to the destination IP address.

7. The method of claim 6, wherein
if the source IP address and the destination IP address of the further traffic packet belong to the same physical server, and the destination MAC address of the further traffic packet is different from the flag MAC address, distributing, by the SDN controller to the first vSwitch, a layer-2 flow table entry and
responsive to the layer-2 flow table entry, forwarding the further traffic packet from a port leading to the destination IP address.

8. The method of claim 1, wherein the source address of the traffic related to flow is a source Internet Protocol (IP) address, and the destination address of the traffic related to flow is a destination IP address, the method further comprising:
in response to the packet relating to flow, accessing information at the SDN controller to determine a destination MAC address corresponding to the destination IP address, wherein the source flow table entry includes the destination MAC address.

9. The method of claim 1, wherein the sending of the traffic relating to flow to the SDN controller is responsive to receiving the traffic packet from the source host and the first vSwitch determining that the traffic packet does not match an entry of a local flow table of the first vSwitch.

10. The method of claim 1, wherein the encapsulating of the traffic packet is responsive to the first vSwitch determining that the traffic packet matches the source flow table entry received from the SDN controller.

11. A software defined network (SDN) controller for controlling flow transmission in an SDN virtualized network, comprising:
- a processor; and
- a non-transitory machine readable storage medium storing instructions executable on the processor to:
  - receive a packet related to flow that is uploaded from a first virtual switch (vSwitch) that is part of a first physical server; and
  - if a source address and a destination address of the packet related to flow belong to different physical servers, distribute a source flow table entry to the first vSwitch, the source flow table entry to cause the first vSwitch to,
  - for a traffic packet whose destination address matches the destination address of the packet related to flow, encapsulate the traffic packet into an encapsulated packet having double layer virtual local area network (VLAN) tags;
  - including an outer layer VLAN tag of a service VLAN where a physical network card of the first physical server is located, an inner layer VLAN tag of a customer VLAN where the source address is located, an outer layer source medium access control (MAC) address of the first vSwitch that is connected to a source host having the source address, and an outer layer destination MAC address of a second vSwitch connected to a destination host having the destination address, and forward the encapsulated packet from a port of the first vSwitch leading to the physical network card of the first physical server to cause the encapsulated packet to be sent to the second vSwitch and
  - receive, from the first vSwitch, a further traffic packet;
  - responsive to determining that the destination MAC address of the further traffic packet is a flag MAC address of a gateway, send, to the first vSwitch, a further source flow table entry with a MAC address substituted with the flag MAC address, to cause the first vSwitch to, if the destination MAC address of the further traffic packet is the flag MAC address, substitute the flag MAC address in the further traffic packet with a MAC address corresponding to a destination IP address.

12. The SDN controller of claim 11, wherein the instructions are executable on the processor to:
- receive, from the second vSwitch, the encapsulated packet having the double layer VLAN tags; and
- in response to receiving the encapsulated packet, distribute a destination flow table entry to the second vSwitch to cause the second vSwitch to de-capsulate the encapsulated packet having the double layer VLAN tags into a de-capsulated traffic packet, and forward the de-capsulated traffic packet from a designated port according to the inner layer VLAN tag of the encapsulated packet and the destination address of the traffic packet.

13. The SDN controller of claim 11, wherein the packet related to flow is an address resolution protocol (ARP) request packet comprising a source Internet Protocol (IP) address and a destination IP address, wherein the instructions are executable on the processor to:
- determine a MAC address corresponding to the destination IP address of the ARP request packet as a result of address resolution in response to the ARP request packet; and
- if the source IP address and the destination IP address of the ARP request packet belong to a same physical server, distribute a layer-2 flow table entry to the first vSwitch.

14. The SDN controller of claim 11, wherein the packet related to flow is the traffic packet, wherein the instructions are executable on the process to:
- if the source address and the destination address of the traffic packet belong to a same physical server, distribute a layer-2 flow table entry to the first vSwitch.

15. The SDN controller of claim 11, wherein the instructions are executable on the processor to:
- receive an ARP request packet comprising a source Internet Protocol (IP) address and a destination IP address uploaded from the first vSwitch;
- if the destination IP address of the ARP request packet indicates a gateway, determine a flag MAC address of the gateway as a result of address resolution in response to the ARP request packet, and include, in an ARP response packet, the flag MAC address of the gateway as a MAC address corresponding to the destination IP address;
- if the destination IP address of the ARP request packet does not indicate a gateway, determine a MAC address of the destination host corresponding to destination IP address of the ARP request packet as a result of address resolution in response to the ARP request packet, and include, in an ARP response packet, the MAC address of the destination host as a MAC address corresponding to the destination IP address.

16. The SDN controller of claim 11, wherein the source address of the traffic related to flow is a source Internet Protocol (IP) address, and the destination address of the traffic related to flow is a destination IP address, and wherein the instruction are executable on the processor to:
- in response to the packet relating to flow, access information at the SDN controller to determine a destination MAC address corresponding to the destination IP address, wherein the source table entry includes the destination MAC address.

17. The SDN controller of claim 11, wherein the instructions are executable on the processor to:
- if a source Internet Protocol (IP) address and a destination IP address of the further traffic packet belong to a same physical server, distribute, by the SDN controller, a layer-3 flow table entry to the first vSwitch; and
- responsive to the layer-3 flow table entry, if a destination MAC address of the further traffic packet is a flag MAC address of a gateway, substitute the flag MAC address in the further traffic packet with a MAC address corresponding to the destination IP address, and forward the further traffic packet from a port leading to the destination IP address.

18. A non-transitory machine-readable storage medium comprising instructions executable on a first physical server to:
- send, by a first virtual switch (vSwitch) on the first physical server to a SDN controller, a packet related to flow;
- receive, by the first vSwitch from the SDN controller, a source flow table entry responsive to the SDN controller determining that a source address and a destination address of the packet related to flow belong to different physical servers comprising the first physical server and a second physical server;
- for a traffic packet whose destination address matches the destination address of the packet related to flow, encapsulate, by the first vSwitch, the traffic packet into an encapsulated packet having double layer virtual local area network (VLAN) tags, the encapsulating comprising including, in the encapsulated packet, an outer layer VLAN tag of a service VLAN where a physical network card of the first physical server is located, an inner layer VLAN tag of a customer VLAN where the source address is located, an outer layer source medium access control (MAC) address of the first vSwitch that is connected to a source host having the source address, and an outer layer destination MAC address of a second vSwitch connected to a destination host having the destination address;

forward the encapsulated packet from a port of the first vSwitch leading to the physical network card of the first physical server to cause the encapsulated packet to be sent to the second vSwitch; and receive, by the SDN controller from the first vSwitch, a further traffic packet;

responsive to determining that a destination MAC address of the further traffic packet is a flag MAC address of a gateway, send, by the SDN controller to the first vSwitch, a further source flow table entry with a MAC address substituted with the flag MAC address; and if the destination MAC address of the further traffic packet is the flag MAC address of the further flow table entry, substitute the flag MAC address in the further traffic packet with a MAC address corresponding to a destination IP address of the destination host.

19. The non-transitory machine-readable storage medium of claim 18, wherein the traffic related to flow comprises an address resolution protocol (ARP) request packet, and the source flow table entry is included in an ARP response packet.

20. The non-transitory machine-readable storage medium of claim 18, comprising instructions executable on the first physical server to:

if a source Internet Protocol (IP) address and a destination IP address of the further traffic packet belong to a same physical server, distribute, by the SDN controller, a layer-3 flow table entry to the first vSwitch; and responsive to the layer-3 flow table entry, if a destination MAC address of the further traffic packet is a flag MAC address of a gateway, substitute the flag MAC address in the further traffic packet with a MAC address corresponding to the destination IP address, and forward the further traffic packet from a port leading to the destination IP address.

* * * * *